Oct. 13, 1953 N. T. BALDANZA 2,655,409
ART OF AND APPARATUS FOR MOLDING BRUSHES
Filed July 5, 1947 2 Sheets-Sheet 1
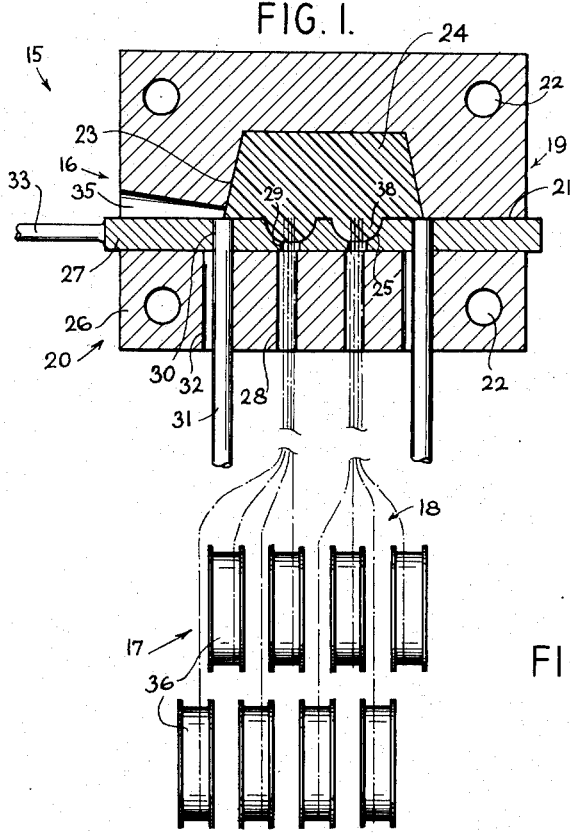
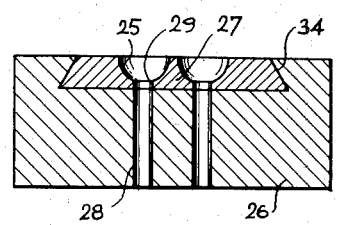
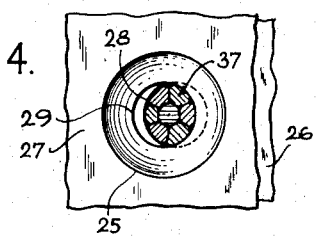
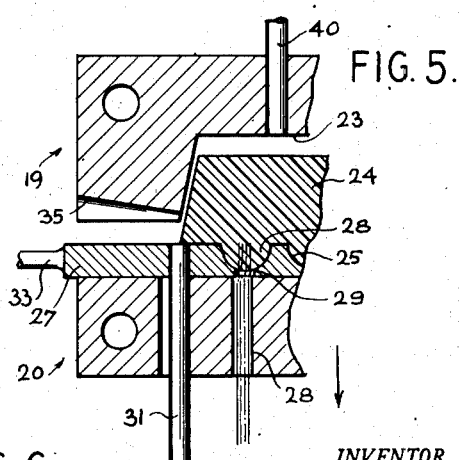
INVENTOR.
Nicholas T. Baldanza
BY
James Schumacher
ATTORNEY Oct. 13, 1953  N. T. BALDANZA  2,655,409
ART OF AND APPARATUS FOR MOLDING BRUSHES
Filed July 5, 1947  2 Sheets-Sheet 2
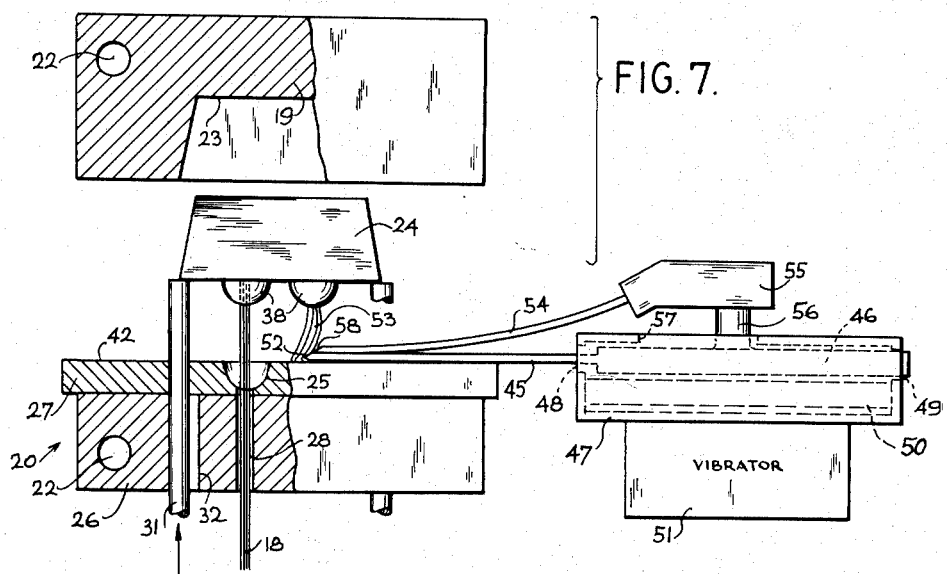
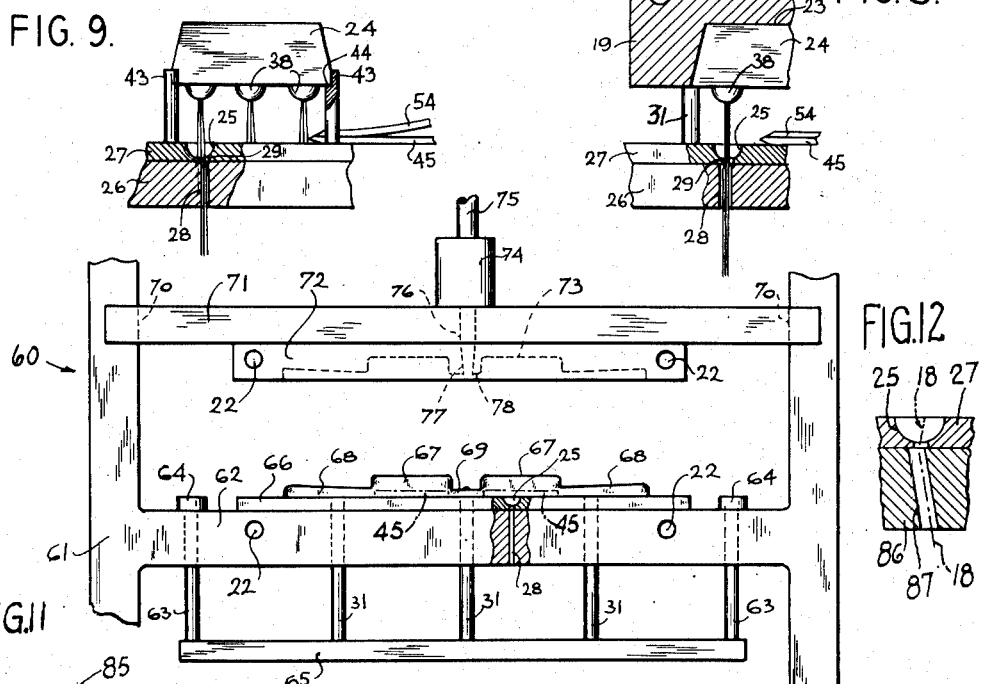
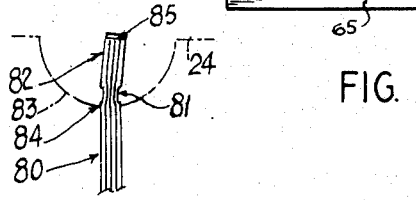
INVENTOR.
Nicholas T. Baldanza
BY
Louis Schumacher
ATTORNEY.

Patented Oct. 13, 1953

2,655,409

UNITED STATES PATENT OFFICE 2,655,409

ART OF AND APPARATUS FOR MOLDING BRUSHES

Nicholas T. Baldanza, Rutherford, N. J., assignor, by mesne assignments, to Columbia Protektosite Co., Inc., Carlstadt, N. J., a corporation of Delaware Application July 5, 1947, Serial No. 759,142

15 Claims. (Cl. 300—21)

This invention relates to improvements concerning the construction and manufacture of brushes and is a continuation in part of my application for Molded Brushes and Art of Making Same filed June 25, 1947, under Ser. No. 756,889, now Patent No. 2,643,158.

One object of the invention is to furnish an improvement in the art of making brushes by a continuous process.

Another object of the invention is the provision of improved apparatus and methods for making brushes in which the bristles are directly embedded in heads formed by injection molding at the extremely high pressures utilized in quantity production, and to produce a brush with improved bristle embedment.

The continuous process involves fundamentally the molding of a head or body in which the bristles become embedded by the molding operation, the bristles then being pulled through holes in the wall of the mold, and then severed to complete the brush and to leave the end portions of long lengths of bristles properly projecting into the mold cavity for embedment in the succeeding brush. Various processes of this general character have been known, and it was proposed to pull the bristles through frictional openings to prevent extrusion of the plastic around the bristles, with the assistance of a chilling action adjacent to the bristles. I have found that such a process is inoperative for high pressure injection molding because the openings had to be capable of permitting sliding feeding movement of the bristles, and hence plastic material would strike through with the result that the tuft became a solid mass of bristle and plastic, and this difficulty could not be overcome by chilling adjacent to the bristles. Also it was proposed that the back of the brush be carried by the bristles preliminary to the severing operation, but in the case of soft bristles, such as those used for babies, the bristles would bend under the weight of the brush back, and would interfere with the severing operation.

The present invention proposes an improvement in the art involving not only the compacting of bristles by a clamping, sealing, or valve-like action, but also the actual mashing or cross-sectional distortion of the bristles to wholly eliminate any spaces therebetween at the point where the mold cavity is sealed around the bristles. I have found that most bristles are capable of a high degree of cross-sectional distortion without breakage or severance, particularly if the action is upon a substantial mass of bristles such as forms the usual tuft of a brush. In this way the tuft becomes virtually a solid body at the point of clamping and minute interstices through which plastic could strike through are avoided.

It is therefore an object of the invention to furnish improved brushes, apparatus and methods for realizing these objects.

Another object of the invention is to furnish an improvement in the art capable of satisfactorily handling in my continuous processes bristles that may have knots therein.

To the best of my knowledge, it is virtually impossible to obtain long, commercial bristles that shall be free from knots. Accordingly I propose to utilize openings at the mold cavity of sufficient size to pass the knots, the size of the openings being relatively immaterial in view of the clamping action described, and such action being of special advantage in this instance because a knot would tend to substantially increase the space between the bristles or altogether prevent the feeding of the bristle.

Another object of the invention is to provide an improvement in the art whereby the ends of bristles are burned or fused together in course of being severed, and still another object is to cause the ends of the bristles of the completed brush to be free of such fusion.

Another object of the invention is to furnish an improvement in the art whereby the brush head is fixedly held in position by a portion of the mold or by a part associated therewith to thus facilitate a rapid and easy cutting of the bristles; and desirably the invention provides for also clamping the bristles during this cutting operation.

Other objects and advantages of the invention will become apparent as the specification proceeds.

With the aforesaid objects in view, the invention comprises the novel features, combinations and arrangements of parts hereinafter described in their preferred embodiments, pointed out in the subjoined claims, and illustrated in the annexed drawing, wherein like parts are designated by the same reference characters throughout the several views.

In the drawing:

Figure 1 is a sectional view, which may be regarded as taken in either a vertical or horizontal plane, showing apparatus embodying the invention, with a molded brush therein, and with bristles arranged for continuous feeding to the mold, the bristles being clamped by the mold.

Fig. 2 is a fragmentary sectional view of a section of the mold.

Fig. 3 is an enlarged sectional view of a series of bristles as loosely fed to the mold.

Fig. 4 is a fragmentary plan view of a portion of the mold section of Fig. 2 in bristle clamping position and showing the bristles of Fig. 3 cross sectionally distorted or mashed to close all interstitial spaces between and around the bristles.

Fig. 5 is a fragmentary sectional view of the apparatus of Fig. 1 showing the mold in slightly open position, with the brush securely held by the clamping bristles for retraction from the mold cavity according to a succeeding step of the process, and also indicating an optional ejector or tamping pin at the mold cavity.

Fig. 6 is a sectional view of the mold of Fig. 1 in open or fully open position, with the clamping engagement on the bristles released according to the next step of the process.

Fig. 7 is a sectional view of the mold with parts in elevation, in accordance with the view of Fig. 6, but with the brush head advanced, and also including apparatus for severing the bristles.

Fig. 8 is a fragmentary sectional view with parts in elevation indicating an alternative step of the process whereby the mold section having the cavity is moved after the stripping step of Fig. 5 to reengage the brush back to securely hold it against the elevating or pusher pins, and with the bristles being preferably again clamped, whereby the brush tuft is securely held at both ends for severance from the long bristles.

Fig. 9 is a view in elevation of a part of the mold with parts in section illustrating a modified way for securely holding the brush back during the bristle severing operation.

Fig. 10 is a fragmentary view in elevation with parts in section illustrating a different way of applying the pusher or ejector rods at the gate and handles of a unit comprising two brushes whereby these rods can be spaced at a distance from the bristles.

Fig. 11 is a view of a tuft modified for superior embedment and showing in dot-dash lines a portion of a brush back with the tuft portion vertical as explained in connection with Fig. 12.

Fig. 12 is a fragmentary sectional view of a modified mold wall.

The advantages of the invention as here outlined are best realized when all of its features and instrumentalities are combined, but useful embodiments may be produced involving less than the whole.

It will be obvious to those skilled in the art to which the invention appertains, that the same may be incorporated in several different constructions. The accompanying drawing, therefore, is submitted merely as showing a preferred exemplification of the invention.

The process invention can be practised with advantage with a different sequence of steps and with the omission of certain steps or addition of other steps thereto.

Referring in detail to the drawing, 15 denotes an apparatus comprising a mold 16 and any suitable means 17 for the continuous feeding or supplying of long bristles 18 to the mold. The latter is intended to exemplify any type of pressure mold, but the advantages of the invention are best realized in connection with injection molding under the extremely high pressures that are employed today with the plastic or other fused material being virtually instantly chilled and solidified as it fills the mold cavity. For simplicity, the mold 16 is shown as comprising only two sections 19 and 20, one or both of which are movable for opening and closing the mold along the parting line 21. Both sections may be provided with passages 22 or equivalent means for heat exchange for the molding of thermosetting materials or of such materials as solidify upon cooling. The section 19 may comprise mold cavity 23 for forming a brush head 24, and the section 20 may comprise component mold cavities at least to the extent of furnishing one or more of the relatively small recesses 25. The section 20 includes a plurality of generally parallel walls 26, 27, which may be plane or curved like segments of a cylinder according to the shape of the brush that is to be formed. In the wall 27 there are formed the recesses 25, the same tapering downwardly, and preferably forming sections of a sphere; but these recesses may also be of any other suitable form. In the wall 26 there are provided openings 28 adapted to register with the recesses 25 and being of approximately equal diameter with the small ends of the latter. These small ends 29 are intended to be relatively blunt to avoid cutting of the bristles. Snugly fitted in holes 30 in the wall 27 are the ejector or pusher rods 31, and suitable clearance openings 32 therefor are provided in the wall 26. The walls 26 and 27 are adapted for relative movement therebetween to move the openings 25 and 28 partially out of register and thus to clamp the bristles at these openings, and more particularly immediately adjacent to the small blunt ends 29. Preferably the wall 26 is relatively stationary while the wall 27 is reciprocable by a suitable actuating means 33 which may form a handle for manual or automatic operation. In course of this movement, the rods 31 move along the slots 32. The wall 26 is relatively thick and forms a powerful support for the comparatively thin wall 27. The rods 31 may serve as guides to facilitate accurate register of openings 25 and 28, but additional guides may be furnished such as dovetail joints 34. An injection opening located in any suitable position may be furnished for example at 35.

The apparatus 17 may for convenience comprise large spools or reels 36 for feeding the bristles 18 to the openings 25, 28. These openings are intended to be of sufficient size so that when they are in register, they will freely pass a predetermined number of bristles as indicated in Fig. 3. In fact, there is preferably sufficient looseness so that knots in the bristles will also be freely passed. These bristles may be of any desired circular or other geometrical or irregular shape in cross section. When the group of bristles is clamped in the manner shown in Fig. 1, the bristles are cross-sectionally distorted, upset, or mashed to close their interstitial spaces and to furnish a virtually solid plug-like seal indicated at 37 in Fig. 4. By the term "mashing" is generally meant that the material involved is beaten to a pulp. In the case of plastic bristles, there is no pulp involved, but the general sense of the term is maintained in that the bristles are squashed so as to close all minute spaces in the resultant contracted opening formed at the junction of the openings 28 and 29. If desired, the wall 27 may be reciprocated a plurality of times to give the bristles a series of blows. Heated plastics under the extremely high pressures of injection molding will extrude through very minute openings, and certain plastics possess a particular facility in this regard. A mere frictional engagement would not prevent such extrusion, nor would rapid chilling be of any material assistance. Such extrusion would be sufficient to transform a tuft of bristles into a solid mass bonded together by the plastic. The clamping engagement herein contemplated may be extremely powerful, but without cutting the bristles or impairing the strength thereof. In the case of nylon bristles, it has been found that while excessive heat will cause bristles to lose some of their stiffness, the clamping herein contemplated does not cause such a defect.

The clamping means at the junction of the openings 28 and 29 thus serves to close all air spaces between and around the bristles, a series of these being employed to properly assume the stress and to afford the most satisfactory results. The number of bristles used to somewhat cushion the shock and prevent cutting will of course vary with the thickness and texture of the bristles. The clamping means involved may be afforded by various constructions operating axially of the bristles or laterally thereof, or by expansion or contraction of the tuft, or by various combinations of these as disclosed in my co-pending application, and the clamping means may be a part of the mold or operatively associated therewith. It is preferred that the clamping action shall occur directly at or very close to a surface of the mold cavity 23, 25. This is facilitated by the provision of the recesses 25, and it will be understood that the bristles may terminate within the resultant integral projections 38 of the brush back 24 or may extend therebeyond into the main body of the back. The bristles may be wholly or partially fused to the back, but are preferably secured therein without such fusion. In a broad sense it may be sufficient to consider the bristles as connected to the back by the molding operation.

If the brush back 24 has been molded, the sections 19 and 20 begin to separate as shown in Fig. 5. During the separation the bristles may remain clamped, whereby the brush back is anchored to the section 20, thus causing the brush back to be stripped from the mold cavity 23. This operation is facilitated by the provision of ample draft in the cavity. Obstructing gates if any could be severed by a knife as well-known in the art. Of course the brush back may be ejected by a pin 40 as an alternative method, but this pin which may be regarded as optional, may be used merely as a tampering means to facilitate removal of the brush back. The next step of the process is shown in Fig. 6, the mold being now fully open and the wall 27 moved in the direction of the arrow 41 to release the clamping of the bristles.

According to the succeeding step of the process, illustrated in Fig. 7 the pusher means 31 is upwardly moved to move the brush back 24 in a direction away from the mold section 20, whereby the brush back correspondingly moves the bristles through the openings 25 and 28, these openings being in the unclamped registering position. The movement referred to may be of any desired degree, but is preferably only sufficient for determining the length of the tufts that are to be severed, whereby the cutting may occur along the upper surface 42 of the member 27 serving as a gage.

As an alternative to the step of Fig. 7, the mold section 19 may be caused to engage or reengage the brush back 24 as shown in Fig. 8. In effect, the mold need not be fully open as shown in Figs. 6 and 7, but after the loosening operation of Fig. 5, the brush head may be reengaged in the section 19, or the latter may be moved to again engage the back of the brush. In this way, a brush back is securely held between the means 31 and the section 19 so that a relatively strong cutting force can be exerted against the bristles. According to Fig. 8, the clamping means may again be manipulated to lock bristles whereby the latter are positively secured at two points between which the cutting operation may be performed with considerable force and speed.

As an alternative to the methods of Figs. 7 and 8, the pusher rods 31 may be modified as shown in Fig. 9 to provide stepped portions 43 affording seats 44 for the corner portions of the brush back. The mold section 19 may have any suitable recesses not shown, to accommodate the projections 43. Now the mold may be in fully open position as shown in Fig. 7 and the bristles will be secured at two points by the clamping means and by the brush back to facilitate a rapid and powerful cutting action as described for Fig. 8.

The bristles may be cut in any suitable manner, the parts herein shown being merely illustrative. For example, rotary discs or vibratory knives or clipping devices may be employed. In association with the cutting operation, heat may be used to fuse together the ends of the bristles along the surface 42, the simplest way being to heat the cutting device itself. Thus I may employ a blade 45 having a thickened heat absorbing shank 46 slidably mounted in any suitable casing 47 that may have guide openings 48, 49. Within this casing there may be an electrical heating device 50, and the casing may be mounted on a vibrator 51 to impart any well-known kind of vibration to the cutting edge of the blade, while the latter is being advanced manually or automatically. As the blade 45 advances, it will shear the bristles of the successive tufts along the surface 42 or slightly spaced therefrom, and the heat of the blade will fuse together the ends of the bristles. In the case of the brush tufts, the fused ends may be eliminated by trimming. If the bristles are not clamped, they will yield and deflect against the large diameter rim of the opening 25 so that after severance, the ends of the remaining long bristles 18 will project sufficiently from the opening 25 to be fused by the blade. If the bristles are secured in the manner described especially in connection with Figs. 8 and 9, the cutting edge 52 of the blade may be spaced slightly above the surface 42 to afford such projecting portions to be fused. In this way tufts such as 53 will be formed. If it be desired to perform the fusion, but without fusing the ends of the tuft 53, a heat insulator blade 54 may be disposed to overlie the blade 45. The insulator 54 may consist of fibrous or other suitable heat insulating material and it may be slightly resilient if necessary. It is connected to a head 55 mounted on a shank 56 passing through a slot 57 in the casing 47, and being connected to the blade shank 46 whereby the members 45 and 54 may move and vibrate as a unit. Being wholly external of the casing 47, the member 54 will not be subjected to undesirable temperature. The member 54 may have a beveled edge 58 located slightly rearward of the cutting edge of the blade to facilitate entrance under the tufts 53. As the blade advances, the insulator member 54 comes between the blade and the severed tuft so that the latter is not subjected to heat for a sufficient time to cause fusion thereof. If it be desired that the bristles of the tuft 53 be cut to irregular lengths, the cutting edge of the blade may be serrated with different teeth being at different elevations substantially in the manner of a saw.

In Fig. 10 is shown an apparatus 60 embodying the invention and illustrating principally a different way of positioning the pusher rods 31 so as to get them further away from the bristles, to afford more room for the cutting operation, and to permit bristles to be located more closely to the edge of the brush back. The apparatus 60 comprises a frame 61 carrying the wall 62 corresponding to that at 26, and through which extend the carrier rods 63 headed at 64 and mounting a bar 65 to which the pusher rods 31 are connected. Slidably mounted on the wall 62 is the wall 66 corresponding to that at 27 but being extended so as to permit the molding of a plurality of brushes 67 having handles 68 and being interconnected by a gate 69. Suitably guided on the frame 61 at the slotted portions 70 is a wall 71 carrying a mold section 72 which corresponds to that at 19 but being formed with two cavities 73 corresponding to the brushes 67. A plastic heating cylinder 74 having a feeding piston 75 is connected to the wall 71 to discharge plastic through passage 76 and nozzle 77 to a gate passage 78 which forms the gate 69. One of the pusher rods 31 is mounted to centrally act on the gate 69 and other pusher rods are mounted to act upon the handles 68, whereby these pusher rods can be amply spaced from the bristle carrying part of the brush. In other respects the parts 60 may follow the construction and provide for the modes of operation hereinbefore described.

It will thus be seen that I have provided a novel method of molding brush heads with a continuous feed of long bristles thereto for connection or embedment with respect to the brush head, the process being adapted to pressure molding generally, but its advantages being realized to the highest degree in connection with injection molding. An important feature of this process is that the bristles of selected number, and consequently of uniform total mass, are fed to mold openings which may be open or circularly closed and in or at which the bristles are pressure compacted. As a further improvement, the bristles are subjected to a strong clamping pressure sufficient to close interstitial spaces between and around the bristles, including spaces between the bristles and the edge of the opening, this being best realized by mashing or distorting the bristles to form an imperforate sealing plug. For the purpose of the process, the mashing referred to may be initially accomplished elsewhere so that a substantially lesser pressure may suffice at the opening mentioned, but the simplicity of the process is best realized by performing it at the mold. In respect to the manner in which the pressure is applied, this may be done in many different ways: for example, shims may be inserted manually or automatically on any of the constructions used herein referred to, it being realized that in conjunction with the mashing of the bristles to form an imperforate plug, it is necessary that the edge of the opening shall tightly hug the plug, and this requires that the effective or bristle receiving area of the opening be reduced or contracted. Such contraction is preferably utilized to exert the mashing pressure. The use of a knife sufficiently hot, facilitates the cutting of the bristles, and serves to fuse the ends of bristles for better embedment.

For hair brushes, neat and perfect form is necessary, with avoidance of air bubbles, and clarity in the case of transparent plastics and these conditions can only be realized by molding at the customary very high pressures. In fact, with the instant invention, higher pressures than customary may be used with advantage to especially powerfully embed the bristles in the brush back.

The invention provides as a new article of manufacture, a brush having a back of molded material and being formed with mound-like projections in which the bristles are embedded, these projections being sufficient in size so that the embedment need not extend between them, whereby the main part of the brush back can be made quite thin in order to conserve molding material and to produce a brush which is light in weight. This novel brush is further characterized in that the bristles are compactly embedded by reason of sufficiently high injection molding pressures. The bristles are especially powerfully compacted at the surface of the projections, by reason of the clamping utilized in the process of manufacture. In fact, the bristles may be mashed so as to form a solid body at the surface of the projections, thus precluding any dirt from entering the latter, and assuring a very strong securement of the bristles. In fact, this mashed or distorted structure may be elongated along the bristles, instead of occurring at only one point, to thus provide an exceptional powerful embedment, as presently described.

In Fig. 11 is shown a modified tuft or bunch of bristles 80 corresponding to those shown at 18 and 53, except that the bristles have been mashed or cross-sectionally distorted at a plurality of closely adjacent points. In this way there is provided virtually a neck or section 81 of substantially reduced diameter as indicated at 37 in Fig. 4. Beyond the section 81 are the end portions 82 of the bristles, and the section 81 together with the portions 82, embedded in the mound-like projection 83 which is like that shown at 38. At the point 84 at the end of the projection 83, the bristles are held in clamped distorted relation as shown in Fig. 4, and the rest of the section 81 may be maintained almost equally highly compacted by the injection mold pressure. The portion 82 in which the bristles remain in the manner shown in Fig. 3, thus corresponds to a head which affords superior anchorage. The portion 82 may or may not have its ends fused together at 85 by the knife 45. It will be perceived that an elongated section 81, free of interstitial spaces and tightly maintained by a relatively large mass of plastic along the length thereof, results in the provision of a superior brush, in which the bristles need not be fused to the back, thus avoiding accidental weakening of the bristles. However, it is not contemplated that fusion of the bristles to the back is excluded according to the present invention.

The elongated section 81 may be produced by the apparatus and according to the method above described, with no change therein, except that the apparatus is differently operated or employs a different drive and cam system. For example, considering Figs. 7, 8 and 9, the plate 27 may be given a series of reciprocations in course of the upward travel of the bristles caused by pusher rods 31 and 43. In other words, when the brush head 24 has been projected to a position within 1/16 or 1/8 of an inch of its ultimate position, the reciprocations of the plate 27 may begin, and this reciprocation may be so rapid as to permit a continuous or interrupted movement of the bristles. This operation may continue until the brush head reaches its final projected position shown in Figs. 7, 8 and 9, whereupon the plate 27 remains in clamped position so that the severing of the bristles can proceed as described. The portion 81 can also be made by forcible advancing constant or pulsating movement of pusher or feeder means 31 as in Figs. 8 or 9, with the clamping pressure of the member 27 constant in degree, but temporarily reduced, if necessary. With the formation of an elongated portion, or irrespective thereof, the full clamping pressure may be delayed or positively applied gradually or resiliently by a uniform force to permit plastic to get between at least the outer bristles of the tuft and then to be partially expressed mainly back into the mold as full clamping pressure is attained, assuring thorough and strong embedment and adhesion at the point 84 and elsewhere; such graduated clamping pressure also permits gradual reorientation of the molecules or fibers of the bristles without undue strain thereon. The brush can be identified by any or all of the characteristics or features mentioned. It may be added that the embedded portions 81 and 82, or at least the latter appear inclined while the tuft portion 80 is vertical, as explained in connection with Fig. 12.

In Fig. 12 is shown a modified mold in which the wall 86 corresponding to that at 26 is formed with the openings 28 inclined as shown at 87 to resist a tendency of the bristles to assume an angular position caused by the clamping action. The angle of the openings 87 may be sufficient to cause the bunch of bristles to resist the angularity, or it may produce a slight bend in the bristles so that they will ultimately lie at right angles to the brush back. This modification may be regarded as incorporated in the other figures of the drawing, the other features of the construction and the mode of operation being otherwise the same.

Although a drive for the apparatus has not been shown herein, the same may be regarded as inherent in the construction. Any suitable drives well-known in the art may be employed together with the requisite cams and the like to obtain a proper timing operation. Thus it is considered to be within the province of anyone skilled in the art to furnish actuator means for opening and closing the mold and for moving the pusher rods 31, and for causing any desired number of reciprocations of the plate 27 as well as for advancing the cutting unit shown in Fig. 7. The handle 33, the cylinder or cross bar 71, the bar 65 and the vibrator 51 may be regarded as such actuator means or at least as portions thereof. It will be understood that after severance of the bristles, the now completed brush is readily removed as in Figs. 8 and 9, manually or otherwise. In Fig. 9, the brush back was previously loosened as in Fig. 5 to break its adhesion to the mold wall.

The apparatus and method may be used to produce a rigid or flexible brush having a multiplicity of tufts arranged in series of rows and columns, and the apparatus and method are particularly adapted to solve the mechanical molding problems involved.

The terms "mashing," "distorting" and "quashing" as applied to the bristles are intended to include not only the application of transverse forces, but also axial or longitudinal forces which may be utilized with advantage in the case of bristles that may be made of a material which distorts so as to expand. Thus metallic bristles may be deformed by compression to cause expansion and hence sealing of the mold cavity.

I claim:

1. The method including feeding in operative position long bristles to an openable mold cavity, molding a brush back in the cavity for connecting the bristles thereto, opening the cavity and causing movement of the brush back with corresponding feeding movement of the bristles, then tuft-cutting the bristles while applying heat at the point of cutting to fuse together the remainder of the long bristles in said operative position.

2. The method according to claim 1, including heat insulating the tuft produced on the brush head during the cutting operation.

3. Apparatus including a mold having a first section having a brush head cavity, a second section comprising a plurality of parallel walls the outer of which is relatively fixed and the inner of which is relatively movable therealong, the walls having bristle receiving openings movable into registry and partially out of register with each other by movement of the inner wall to permit free movement of bristles when the openings are in register and to clamp and compress the bristles and seal the openings of the inner wall when the openings of the walls are partially out of register, the sections being movable toward and away from each other, the inner wall being thin and forming a seat for the first section, and the outer wall slidably supporting the inner wall.

4. Apparatus including a mold having sections one of which is movable with respect to the other to open and close the mold including a first section having a mold cavity, a second section having means whereby long bristles can be fed to the mold cavity and the latter sealed about the bristles to prevent extrusion of molding material thereat, said means including means releasably clamping and compressing the bristles in sealing position, means for injecting molding material into the cavity to form a brush back to which the bristles thus become connected, and means operative in the released position of the first mentioned means to move the brush head to a projected position in open position of the mold to thus cause the brush head to move the bristles in feeding relation to the cavity, and means to sever the bristles to form a tuft on the brush head in the said projected position thereof.

5. Apparatus including a mold having sections one of which is movable to open and close the mold, including a first section having a mold cavity, a second section having means whereby bristles can be fed to the cavity and the latter sealed about the bristles to prevent extrusion thereat, including means for releasably clamping and compressing the bristles in sealing condition, means for injecting molding material into the cavity to form a brush back to which the bristles thus become connected, the sections being separable to cause the brush back to be stripped from the cavity by tension on the clamped bristles, means for moving the brush back in a direction away from the second section upon release of the bristles, and means for actuating the means for releasably clamping the bristles.

6. Apparatus including a mold having sections one of which is movable to open and close the mold, including a first section having a mold cavity, a second section having means whereby long bristles can be fed to the mold cavity for connection to a brush back molded therein with the cavity sealed by said means, including means for releasably compressing the bristles in sealing condition, the mold having means for moving the brush back to a projected position in a direction away from the second section in the open position of the mold and with the compressing means released so that the bristles feedingly move with the brush back, the mold having a part cooperating with the moving means for releasably holding the brush back in said projected position, and means for cutting the bristles between the brush back and the second section in the projected position of the former, with the compressing means adapted to anchor the bristles at the second section during the cutting.

7. Apparatus including a mold having sections one of which is movable to open and close the mold, the latter having a mold cavity and means whereby long bristles can be fed to the cavity to operative position for connection to a brush head as the same is molded in the cavity, the brush head being movable to a projected position when the mold is open to feedingly move the bristles to operative position for connection to a next succeeding brush head that is to be molded, a cutter for cutting the bristles in said projected position to form a tuft thereon, and means for applying heat to the cutter to fuse together the ends of the remainder of the bristles in the operative position thereof.

8. Apparatus according to claim 7 including means for shielding the tuft from the heated cutter.

9. Apparatus including a mold having a first section having a mold cavity, a second section having an opening for feeding long bristles to the mold cavity for connection to a brush back that is being molded therein, one section being movable to open the mold, and means on the second section for moving the brush back to correspondingly move the bristles through the hole for a distance approximately equal to the length of the desired tuft that is to be formed by cutting the bristles, the said moving means cooperating with the first section so that the brush head is securely positioned in the mold cavity thereof by the pressure of the moving means to preclude shifting of the brush back upon cutting the bristles.

10. Apparatus according to claim 9 including means for cutting the bristles to form said tuft in the said secured position of the brush head.

11. Apparatus including a first means having an openable mold having an opening for feeding bristles to the mold cavity thereof for connection to a brush back that is molded therein, the first means including releasable sealing means for the opening clamping the bristles together thereat, means for actuating the sealing means, and means for moving the brush back to move the bristles a predetermined distance through the opening in the released position of the sealing means.

12. Apparatus according to claim 11 wherein the first means includes means for holding the brush back against movement in different directions in the position to which it has been moved, with the mold being open.

13. Apparatus according to claim 11 wherein the first means includes parts for holding the brush back against movement in different directions by cooperation with the said moving means, the actuating means being operative to again cause clamping of the bristles, and means for cutting the latter while thus fixedly held between the brush back and the clamping means.

14. Apparatus including a first means including an openable mold having a mold cavity provided with an opening for feeding bristles to the cavity for connection to a brush head molded therein, the mold being openable and said first means causing the brush back to be so moved as to pull the bristles through the opening for a predetermined tuft forming length, means for cutting the bristles to form the tuft, and means for applying heat to the cutting means.

15. The method of manufacturing brushes comprising feeding in operative position, long lengths of brushes into a mold section, molding a brush head in the cavity of a companion mold section so that the bristles are connected to the head by embedment of the ends thereof, separating the sections and moving the head to cause corresponding feeding movement of the long bristles, retaining the head in part of the mold, severing the bristles to a predetermined length while applying heat at the point of cutting to fuse together the remainder of the long bristles in said operative position, including heat insulating the free end of the bristles on the brush head during the cutting operation.

NICHOLAS T. BALDANZA.

References Cited in the file of this patent

UNITED STATES PATENTS

| Number | Name | Date |
|---|---|---|
| 247,247 | Gruber | Sept. 20, 1881 |
| 555,687 | Estabrook | Mar. 3, 1896 |
| 654,184 | Schwartz | July 24, 1900 |
| 798,380 | Alexander | Aug. 29, 1905 |
| 826,119 | Schwartz | July 17, 1906 |
| 1,148,566 | Barry | Aug. 3, 1915 |
| 1,439,766 | Sherman | Dec. 26, 1922 |
| 2,078,358 | Wright | Apr. 27, 1937 |
| 2,125,735 | Morrison | Aug. 2, 1938 |
| 2,298,156 | Person | Oct. 6, 1942 |
| 2,303,800 | Swann | Dec. 1, 1942 |
| 2,438,156 | Dodge | Mar. 23, 1948 |

FOREIGN PATENTS

| Number | Country | Date |
|---|---|---|
| 5,664 | Great Britain | Apr. 2, 1889 |